United States Patent
Chen et al.

(10) Patent No.: US 12,308,661 B2
(45) Date of Patent: May 20, 2025

(54) METHOD FOR CONTROLLING WIRELESS CHARGING, ELECTRONIC DEVICE AND STORAGE MEDIUM

(71) Applicant: BEIJING XIAOMI MOBILE SOFTWARE CO., LTD., Beijing (CN)

(72) Inventors: Chaoxi Chen, Beijing (CN); Zhiwu Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 677 days.

(21) Appl. No.: 17/584,789

(22) Filed: Jan. 26, 2022

(65) Prior Publication Data
US 2023/0029599 A1    Feb. 2, 2023

(30) Foreign Application Priority Data
Jul. 27, 2021   (CN) .......................... 202110848914.3

(51) Int. Cl.
*H02J 50/20*    (2016.01)
*H02J 50/80*    (2016.01)
*H04B 5/79*    (2024.01)

(52) U.S. Cl.
CPC .............. *H02J 50/20* (2016.02); *H02J 50/80* (2016.02); *H04B 5/79* (2024.01)

(58) Field of Classification Search
CPC .. H02J 50/20; H02J 50/23; H02J 50/27; H02J 50/50; H02J 50/60; H02J 50/80; H02J 50/90; H04B 5/79
USPC .......................................................... 320/108
See application file for complete search history.

(56) References Cited

U.S. PATENT DOCUMENTS

| 2016/0181854 A1* | 6/2016 | Leabman ................ H02J 50/15 320/108 |
| 2017/0077995 A1 | 3/2017 | Leabman |
| 2020/0021128 A1 | 1/2020 | Bell et al. |

OTHER PUBLICATIONS

European Patent Application No. 22156349.7, Search and Opinion dated Jul. 18, 2022, 9 pages.

* cited by examiner

*Primary Examiner* — Paul Dinh
(74) *Attorney, Agent, or Firm* — Cozen O'Connor

(57) ABSTRACT

A method and device for controlling wireless charging, an electronic device and a storage medium. The method includes: determining location information of a wireless receiving end; identifying a location relationship between the wireless receiving end and a target; and controlling the wireless transmitting end to suspend energy transmission or to adjust a parameter of energy transmission on basis of the location relationship between the target and the wireless receiving end.

15 Claims, 5 Drawing Sheets

METHOD FOR CONTROLLING WIRELESS CHARGING, ELECTRONIC DEVICE AND STORAGE MEDIUM

CROSS-REFERENCE TO RELATED APPLICATIONS

This application is based upon and claims priority to Chinese Patent Application No. 202110848914.3, filed on Jul. 27, 2021, the entire content of which is incorporated herein by reference.

TECHNICAL FIELD

The present disclosure relates to the field of charging, and more particularly, to a method for controlling wireless charging, an electronic device and a storage medium.

BACKGROUND

With the development of technology, wireless charging has become more and more popular due to its convenience. Wireless charging technology transmits energy in the form of wireless signal through an antenna, and the receiving device receives the energy and converts the energy into electricity to achieve charging.

In related art, existing wireless charging technology tend to generate a high electromagnetic energy density during the charging process, and may pose radiation risk to living bodies.

SUMMARY

A method for controlling wireless charging, executed by a wireless transmitting end, is provided. The method includes:
  determining location information of a wireless receiving end;
  identifying a location relationship between the wireless receiving end and a target; and
  controlling the wireless transmitting end to suspend energy transmission or to adjust a parameter of energy transmission on basis of the location relationship between the target and the wireless receiving end.

An electronic device is provided. The electronic device includes:
  a processor, and
  a memory for storing instructions executable by the processor;
  wherein the processor determines location information of a wireless receiving end; identifies a location relationship between the wireless receiving end and a target; and controls the wireless transmitting end to suspend energy transmission or to adjust a parameter of energy transmission on basis of the location relationship between the target and the wireless receiving end.

A non-transitory computer-readable storage medium is provided. The non-transitory computer-readable storage medium having stored therein instructions that, when executed by a processor of an electronic device, causes the electronic device to perform the method for controlling wireless charging mentioned above.

BRIEF DESCRIPTION OF THE DRAWINGS

The drawings herein are incorporated into the specification and constitute a part of the specification, show embodiments in accordance with the present disclosure and explain the principle of the present disclosure in combination with the specification.

DETAILED DESCRIPTION

Figure 1:
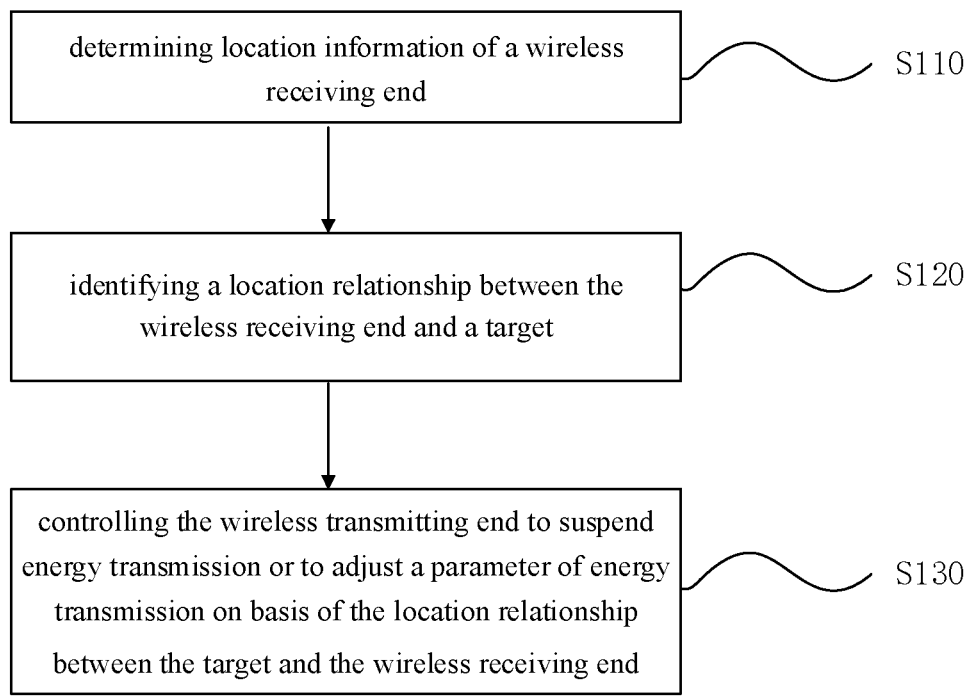
FIG. 1 is a flow chart showing a method according to an embodiment.

Illustrative embodiments will be described in details below, and examples thereof are shown in the drawings. When the following description refers to the drawings, the same numbers in different drawings indicate the same or similar elements unless otherwise indicated. The implementation manners described in the following illustrative embodiments do not represent all implementation manners consistent with the present disclosure. On the contrary, they are merely examples of devices and methods consistent with some aspects of the present disclosure as detailed in the claims.

Various charging methods exist for mobile terminals such as mobile phones. While improving the charging speed of mobile terminals, the charging methods also pay more attention to the user experience. For example, fast charging technology can charge at a high speed, thereby shortening the charging time and meeting the user's demand for charging time. Alternatively, wireless charging technology can improve the convenience of the charging and meet the charging demands of users on different occasions.

With the development of technology, wireless charging technology has gradually become a new charging method due to its outstanding convenience. The wireless charging technology transmits wireless signal energy through an antenna and the receiving device receives the energy and converts the energy into electricity, thereby achieving the charging.

In the related technology, the wireless charging technology generates a high electromagnetic energy density during the charging process, and thus it is easy to generate large radiation to living bodies.

In embodiments of the present disclosure, a method for controlling wireless charging, applied to a wireless transmitting end, is provided. The method includes:
  determining location information of a wireless receiving end;
  identifying a location relationship between the wireless receiving end and a target; and
  controlling the wireless transmitting end to suspend energy transmission or to adjust a parameter of energy transmission on basis of the location relationship between the target and the wireless receiving end.

According to the method, the location information of the wireless receiving end and the location relationship between the wireless receiving end and the target such as the human body are acquired, thus the way of energy transmission is adjusted in time. In the process of wireless charging for the wireless receiving end, the radiation of charging to the target can be avoided or reduced timely, thus improving the user experience.

In an illustrative embodiment, the method of the embodiment is applied to a wireless transmitting end. The wireless transmitting end (TX) may be, for example, a wireless charger. Among them, the wireless transmitting end (TX) includes a processor (CPU), a variety of sensors, and a radio frequency module (RFFE).

As shown in FIG. 1, the method in embodiments of the disclosure may include the following steps:

S110 determining location information of a wireless receiving end;

S120 identifying a location relationship between the wireless receiving end and a target; and S130 controlling the wireless transmitting end to suspend energy transmission or to adjust a parameter of energy transmission on basis of the location relationship between the target and the wireless receiving end.

In the step S110, the wireless receiving end (RX) may be, for example, a terminal device such as a mobile phone, a tablet computer, a headset, a smart sound, a smart wearable device and the like. The wireless transmitting end (TX) transmits energy through the antenna and the energy is received by the terminal device and converted into electricity for charging.

In the step, the location information may include, for example, information such as direction, distance, angle, coordinates and the like where the terminal device is located. The wireless transmitting end can detect data related to the location of the terminal device through a built-in positioning sensor. The processor acquires the data detected by the sensor and determines the location information. Alternatively, the terminal device sends relevant location information of its own positioning to the processor through communication connection.

In the step S120, the target is, for example, a living body such as a human body or an animal. In embodiments of the present disclosure, the human body is taken as an example. The sensors in the wireless transmitting end further include recognition sensors such as a face recognition camera module, an infrared module or a 3D recognition module. The processor may recognize and know the imaging of the terminal device and the target by controlling the recognition modules, thereby knowing the location relationship between the terminal device and the target.

In an example, the step S120 may include the following steps.

S1201 Acquiring image information of the wireless receiving end and the target. In the step, the terminal device can collect and identify objects in the viewing range in real time through a camera module and a matrix pixel-level TOF (time-of-flight ranging sensor). The camera module and the TOF may be integrated or independently set. TOF emits infrared light or laser pulses. In embodiments of the disclosure, TOF includes an infrared emitting light source of 940 nm, which emits infrared light. The infrared light meets the object and is reflected to the camera module to acquire the depth data of the object, thus acquiring the distance of the object or the image data of the 3D imaging model. The processor acquires the image data collected by the camera module and the TOF.

S1202 Determining the location relationship between the wireless receiving end and the target based on an outline of the wireless receiving end and an outline of the target in the image information. In the step, the location relationship includes whether the target blocks the wireless receiving end. The processor recognizes the outline of the wireless receiving end and the outline of the target in the image information through the recognition algorithm, which can determine the locations of the wireless receiving end and the target in the image and can further determine the location relationship between the terminal device and the target.

In other examples, the matrix pixel-level TOF may also include an infrared light source of 1300 nm in addition to the infrared emitting light source of 940 nm. The 940 nm of light source is configured to realize distance measurement, and the 1300 nm of infrared light source is configured to realize infrared human-body perception. The processor acquires the detection result of TOF.

In step S130, when the recognition result in step S120 is combined, the location relationship between the target and the terminal device can have multiple scenarios. For example, within the collection range of the wireless transmitting end, the target is located on the charging path between the wireless transmitting end and the terminal device, that is, the target blocks the terminal device. For another example, within the collection range of the wireless transmitting end, the target is located outside the charging path between the wireless transmitting end and the terminal device, that is, the target does not block the terminal device. For another example, within the collection range of the wireless transmitting end, terminal device exists, that is, there is no target in the range of air-space charging and the target does not block the terminal device.

For different scenarios, the wireless transmitting end can have multiple working modes. For example, when the target blocks the terminal device, the processor can control to suspend the energy transmission or adjust the parameter of the energy transmission such as reducing the charging power. For another example, when the target does not block the terminal device, the processor can control to maintain the parameter of the current energy transmission.

In other embodiments, the wireless transmitting end may further be integrated with a photosensitive element. Based on the detection result of the photosensitive element, the charging is maintained normally at night.

It is understandable that the method for wireless charging in the embodiment is based on the antenna to realize energy transfer and charging, so that the wireless transmitting end and the terminal device are both multiple input multiple output antenna array (MIMO) devices.

In the embodiments, the terminal device may further determine the attitude of the terminal device based on the internal a+g sensors (accelerometer and gyroscope) and transmit the real-time attitude data to the wireless transmitting end based on the communication connection. The wireless transmitting end can refer to the attitude of the terminal device so as to more accurately determine the location relationship between the target and the terminal device.

Figure 2:
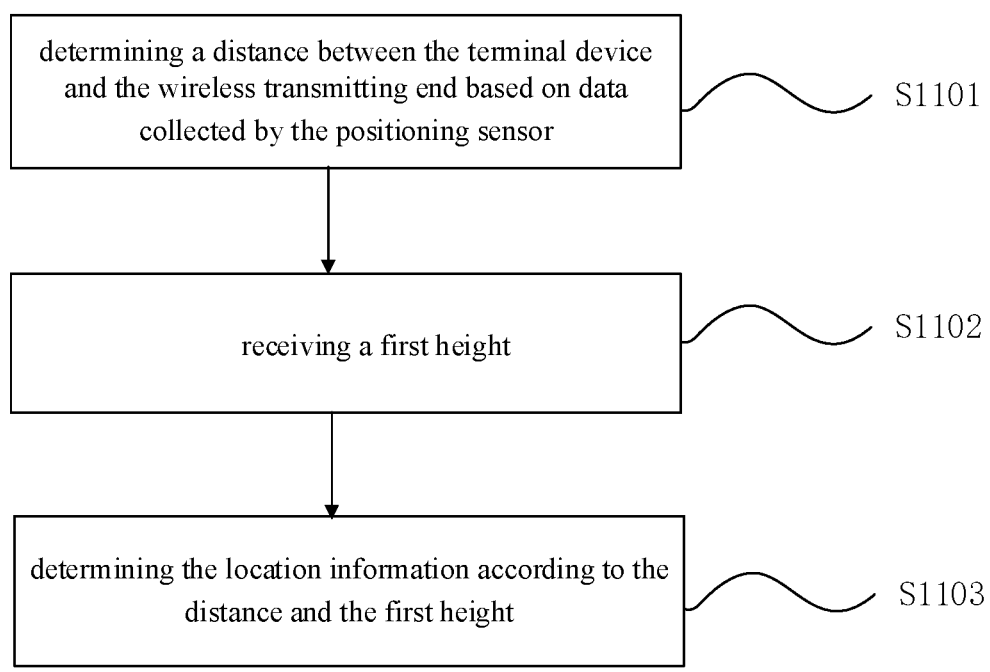
FIG. 2 is a flow chart showing a method according to an embodiment.

In an illustrative embodiment, the wireless transmitting end is provided with a first positioning sensor. As shown in FIG. 2, the step S110 in the embodiments may include the following steps:

S1101 determining a distance between the terminal device and the wireless transmitting end based on data collected by the positioning sensor;

S1102 receiving a first height; and

S1103 determining the location information according to the distance and the first height.

In the step S1101, the positioning sensor may be, for example, an infrared sensor or a TOF sensor. The first positioning sensor can determine the distance D of the terminal device from the wireless transmitting end by transmitting a signal such as an infrared signal and according to the signal reflected by the terminal device.

In the step S1102, the first height is sent through the wireless receiving end and for characterizing the height of the terminal device relative to the horizontal plane.

In the step, the terminal device is integrated with a sensor for detecting the height, such as a barometer. After the terminal device detects the first height $H_1$ at which it is located through the internal barometer, the terminal device sends the first height $H_1$ to the processor of the wireless transmitting end based on the communication connection, and thus the processor receives the first height $H_1$.

In the step S1103, the processor of the wireless transmitting end may determine the location information according to the distance D and the first height $H_1$. The location information includes, for example, the orientation of the terminal device, such as the angle and direction of the terminal device.

Figure 3:
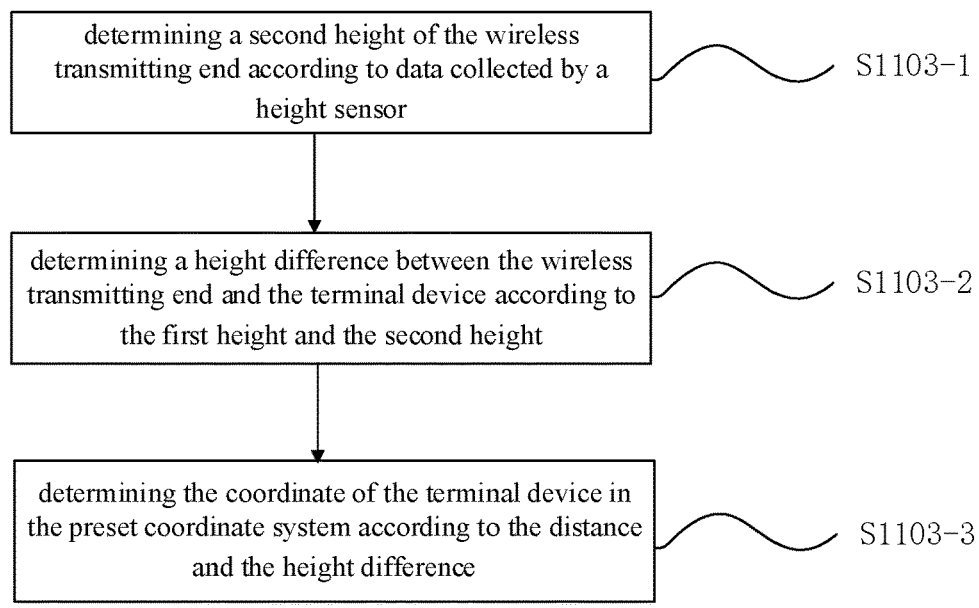
FIG. 3 is a flow chart showing a method according to an embodiment.

In an illustrative embodiment, the location information may further include a coordinate of the terminal device in a preset coordinate system. As shown in FIG. 3, the step S1103 in embodiments of the disclosure may include the following steps:

S1103-1 determining a second height of the wireless transmitting end according to data collected by a height sensor;

S1103-2 determining a height difference between the wireless transmitting end and the terminal device according to the first height and the second height; and S1103-3 determining the coordinate of the terminal device in the preset coordinate system according to the distance and the height difference.

In the step S1103-1, the height sensor is disposed at the wireless transmitting end. For example, the height sensor may be a barometer. The second height $H_2$ is for characterizing the height of the wireless transmitting end relative to the horizontal plane. The processor acquires the data detected by the height sensor and determines the second height $H_2$.

In the step S1103-2, the processor can determine the height difference $\Delta H = H_1 - H_2$ between the first height $H_1$ acquired in the step S1102 and the second height $H_2$ acquired in the step S1103-1.

In the step S1103-3, the processor may control to construct the preset coordinate system according to the location of the wireless transmitting end. An origin O (0, 0, 0) of the preset coordinate system is the wireless transmitting end, an XY plane (or an XOY plane) of the preset coordinate system is parallel to the horizontal plane, and a Z axis of the preset coordinate system is perpendicular to the horizontal plane.

In the step, the coordinate of the location of the wireless transmitting end is O (0, 0, 0) and the location of the terminal device is set to (X, Y, Z), in which $Z = \Delta H = H_1 - H_2$. In combination with the distance D between the terminal device and the wireless transmitting end determined in step S1101, the processor can solve and determine X and Y.

It is understandable that in the process of solving X and Y, to simplify the calculation process, a reference point with a known coordinate and a known distance from the origin can be set in the preset coordinate system. X and Y are solved in the form of equations or matrices by combining multiple reference points.

In the embodiments, relative to the location information of the terminal device acquired, the spatial coordinates of the terminal device can be accurately acquired.

Figure 4:
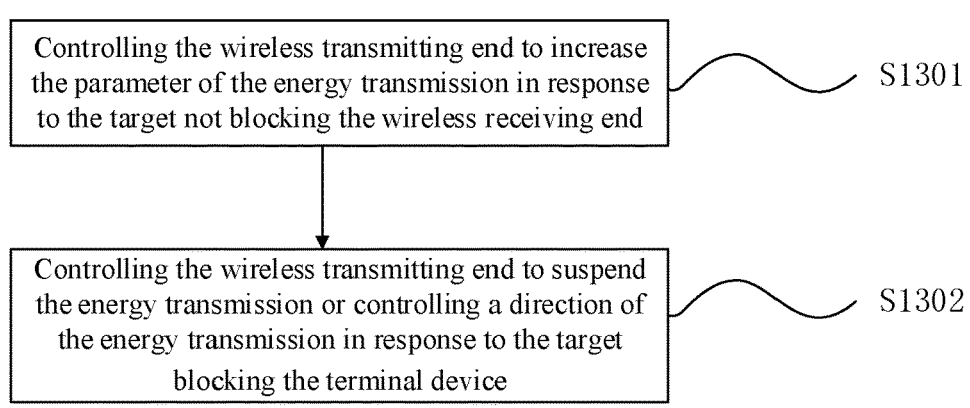
FIG. 4 is a flow chart showing a method according to an embodiment.

In an illustrative embodiment, as shown in FIG. 4, the step 130 in embodiments of the disclosure may include the following steps:

1301 controlling the wireless transmitting end to increase the parameter of the energy transmission in response to the target not blocking the terminal device; or 1302 controlling the wireless transmitting end to suspend the energy transmission or controlling a direction of the energy transmission in response to the target blocking the terminal device.

In combination with step S120, the processor can determine the location relationship between the terminal device and the target according to the image data collected by the camera module or the TOF. The embodiment may include different control procedures according to different location relationships.

In step S1301, the image data shows that the target does not block the terminal device. For example, the target is located outside the charging path between the wireless transmitting end and the terminal device. For another example, the terminal device exists within the collection range of the wireless transmitting end, that is, there is no target in the range of air-space charging.

In the step, the processor can control to increase the parameter of the energy transmission, for example, increase the charging power. In the example shown in FIG. 5, the step may include the following steps.

S1301-1 acquiring a current power capacity of the terminal device. In the step, the terminal device can determine the current power capacity. The processor of the wireless transmitting end acquires the current power capacity determined by the terminal device based on the communication.

S1301-2 controlling the wireless transmitting end to increase transmission power for charging in response to the target not blocking the terminal device and the current power capacity lower than a threshold. In the step, in the case that the processor of the wireless transmitting end determines that the two conditions are met at the same time, that is, the target does not block the terminal device and the power capacity of the terminal device is lower than a threshold, the transmission power for charging is increased. Thus, the charging speed is increased in the premise of ensuring safety, thereby the user experience is further enhanced.

In other embodiments, when the target does not block the terminal device or when the current power capacity of the terminal device is relatively high, the processor can control the wireless transmitting end to maintain the parameter of the energy transmission.

In step S1302, the image data shows that the target blocks the terminal device, for example, the target is located on the charging path between the wireless transmitting end and the terminal device. The processor can control the wireless transmitting end to suspend the energy transmission to prevent the energy from passing through the target. When the leave of the target is detected or under the user's operation instruction, the energy is re-transmitted to start charging.

In the step, in the case that the target blocks the terminal device, the processor of the wireless transmitting end can further control the direction of the energy transmission to avoid the target.

In an illustrative embodiment, the method may include the following steps:

S210 determining location information of the terminal device;

S220 identifying the location relationship between the terminal device and the target; and S230 controlling a direction of the energy transmission in response to the target blocking the terminal device.

Among them, the implementation manners of step S210 to step S220 may refer to step S110 to step S120 in the embodiments as mentioned above, which will not be repeated.

In step S230, the wireless transmitting end includes a first antenna assembly. For example, the first antenna assembly may include a plurality of antennas. The plurality of antennas may be arranged in a preset manner.

Figure 6:
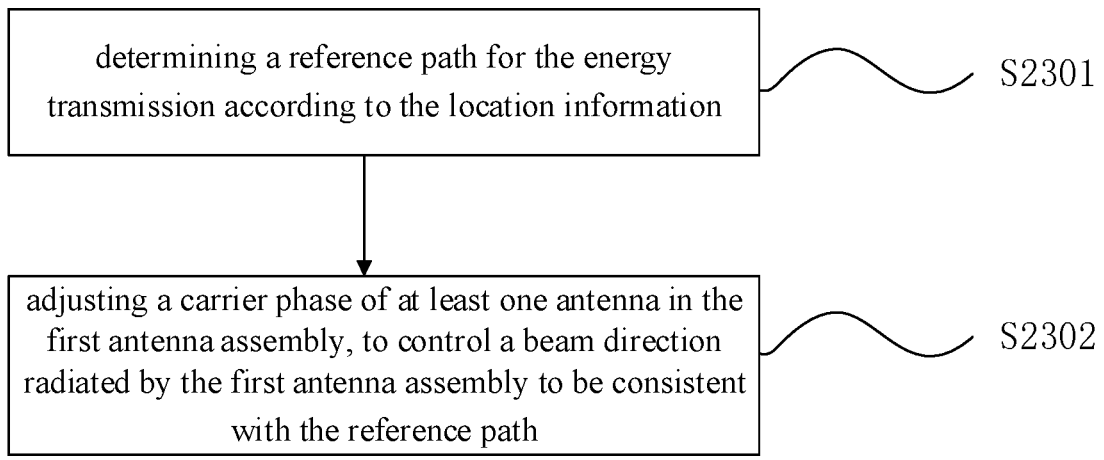
FIG. 6 is a flow chart showing a method according to an embodiment.

In embodiments of the disclosure, as shown in FIG. 6, the step S230 may include the following steps:

S2301 determining a reference path for the energy transmission according to the location information; and S2302 adjusting a carrier phase of at least one antenna in the first antenna assembly, to control a beam direction radiated by the first antenna assembly to be consistent with the reference path.

In step S2301, the reference path directs to the terminal device and avoids the target. The initial path for the energy transmission from the wireless transmitting end may be, for example, along the line with the terminal device. In the case that the target blocks the terminal device, the reference path needs to be farther than the initial path to bypass the target.

Figure 7:
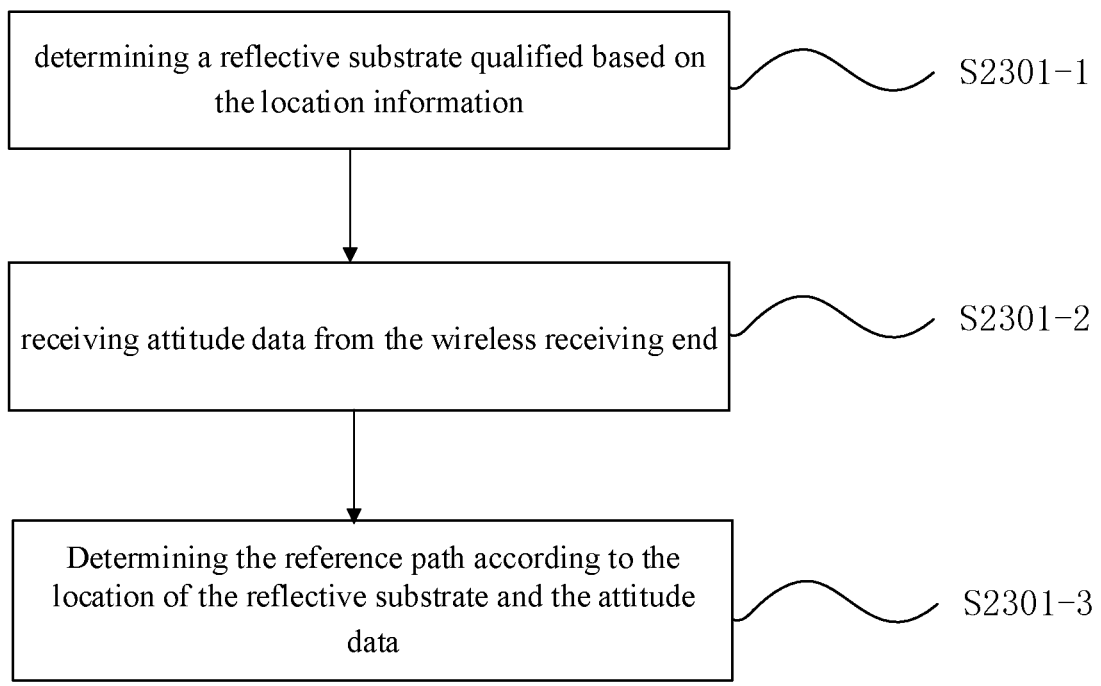
FIG. 7 is a flow chart showing a method according to an embodiment.

In the step, in combination with FIG. 7, determining a reference path may include the following steps.

S2301-1 Determining a reflective substrate qualified based on the location information. In the step, the reflective substrate is located in space between the wireless transmitting end and the terminal device. The wireless transmitting end can determine an object of suitable material as the reflective substrate through the identification of a sensor. The reflective substrate may be such as wall, glass, curtain, display screen or the like. The coordinate of the reflective substrate in the preset coordinate system can be determined by the detection of the sensor.

S2301-2 Receiving attitude data from the wireless receiving end. In the step, the attitude data is sent through a wireless receiving end such as a terminal device. The terminal device may determine the attitude data based on the internal a+g sensors. The attitude data may include but are not limited to the orientation of the display screen of the terminal device or the orientation of the earpiece. The processor of the wireless transmitting end receives the attitude data and the position of the receiving antenna closest to the wireless transmitting end can be determined according to the attitude data.

S2301-3 Determining the reference path according to the location of the reflective substrate and the attitude data. In the step, the reference path includes a first part transmitted from the wireless transmitting end to the reflective substrate, and a second part reflected from the reflective substrate to the terminal device. That is, the energy emitted by the wireless transmitting end is transmitted to the terminal device through the reflection of the reflective substrate.

The processor can determine the location of the receiving coil of the terminal device or the location of the receiving antenna closer to the wireless transmitting end according to the attitude data. This step may include the following steps.

The processor determines a location of a receiving point in the wireless receiving end according to the attitude data. Among them, the receiving point is a receiving coil or a receiving antenna. An emission angle of the first part is determined according to the location of the reflective substrate. The reference path is determined by setting the wireless transmitting end as a start point, the reflective substrate as a reflection point and the location of the receiving point as an end point.

The processor determines a reference propagation mode of the path, that is, the reference path, according to the coordinate of the reflective substrate, the coordinate of the terminal device and the location of the receiving point in the terminal device.

It is understandable that the farther the path is, the greater the energy attenuation during the radiation process is. Therefore, in the process of determining the reference path, the shortest path among a plurality of reference paths is determined as the preferred reference path.

In step S2302, the wireless transmitting end is provided with a radio frequency module. The radio frequency module includes a phase shifter. The processor is connected to the first antenna assembly through the radio frequency module. In the case that the processor controls and adjusts the direction of the energy transmission, the signal output from the phase shifter in the radio frequency module to the first antenna assembly can be adjusted, thereby changing the carrier phase of the antenna in the first antenna assembly. The carrier phase of each antenna in the first antenna assembly can be adjusted independently or adjusted in group.

In the step, a beam direction radiated by the first antenna assembly can be changed by adjusting the carrier phase of at least one antenna in the first antenna assembly. For example, the total energy emitted by the wireless transmitting end is E1 and the first antenna assembly includes n antennas, and thus the energy to be transmitted by each antenna in the first antenna assembly is E2=E1/n. Assuming the communication frequency of the antenna is f, the phase difference of each antenna can be $\varphi=2\pi/n$. The processor of the wireless transmitting end controls the radio frequency module to adjust the phase of the signal transmitted by each antenna, so that the waveform radiated by each antenna is superimposed to form a beam direction with a thin strip and strong directivity.

Figure 8:
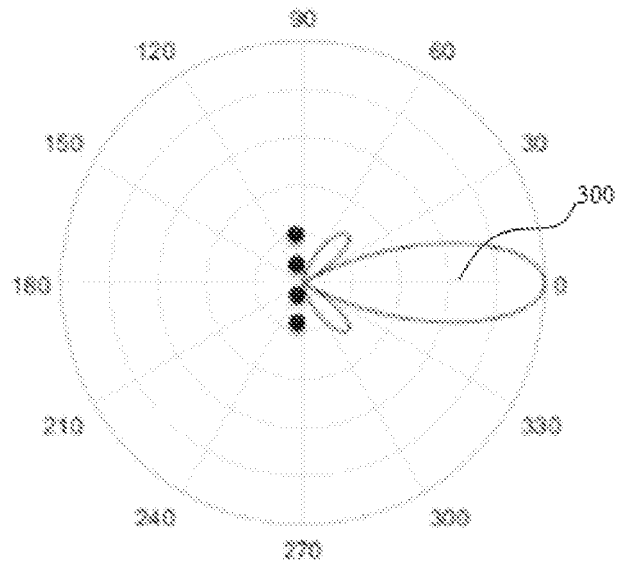
FIG. 8 is a schematic diagram showing radiation of an antenna according to an embodiment.

The beam direction radiated by the first antenna assembly is, for example, the extension direction of the main beam formed by the superimposition of the radiation waveforms of all antennas in the array antenna and having the characteristics of an extension shape. The extension direction of the main beam formed by the superimposition of the radiation waveform of each antenna is the beam direction. As shown in FIG. 8, the radiation waveforms of the plurality of antennas can form a main beam 300, and the extension direction of the main beam 300 is the beam direction. It is understandable that the waveform radiated by each antenna can be represented by a trigonometric function. Thus, the main beam 300 can be understood as a waveform obtained by multiplying the waveforms radiated by the plurality of antennas. The direction or pointing of the main beam can be adjusted by adjusting the waveform of any antenna. By adjusting the carrier phase of the antenna, the main beam can be narrowed to form a slender shape, thereby changing the direction of the main beam, that is, the beam direction.

After the adjustment of the carrier phase, the transmission efficiency of the first antenna assembly can further be determined so as to improve the charging efficiency. For example, assuming the receiving power of each antenna in the terminal device is Pr and the spatial coupling efficiency is w, the transmission power of each antenna in the wireless transmitting end is Pt=w*Pr.

In the step, the beam direction is consistent with the reference path. For example, the path transmitted in the beam direction coincides with the reference path. Alternatively, the difference between the path transmitted in the beam direction and the reference path is within a set range.

In embodiments of the disclosure, according to adjusting the carrier phase of the antenna, the beam direction can be controlled to bypass, so that the emitted energy can bypass the human body during the effectively charging of the terminal device by the wireless transmitting end.

Figure 9:
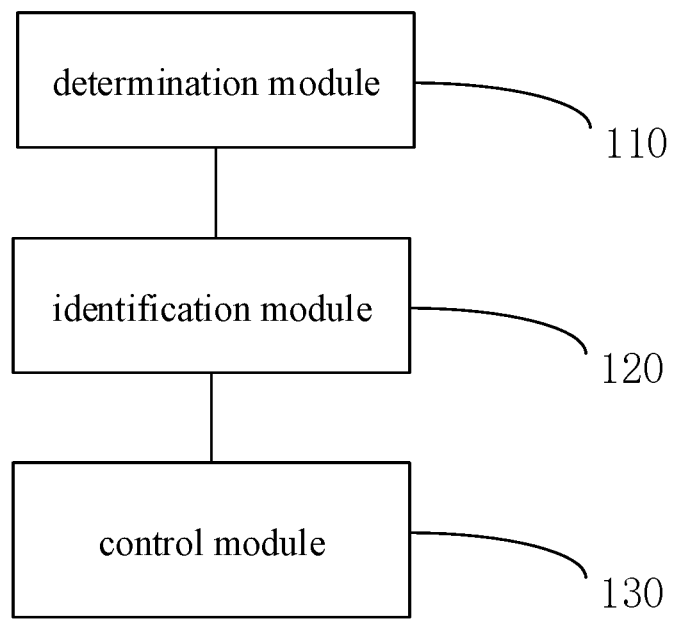
FIG. 9 is a block diagram showing a device according to an embodiment.

In an illustrative embodiment, the embodiment of the present disclosure further provides a device for controlling wireless charging, applied to a wireless transmitting end. As shown in FIG. 9, the device in embodiments of the disclosure includes a determination module 110, an identification module 120 and a control module 130. The device in embodiments of the disclosure is configured to implement the method as shown in FIG. 1. The determination module 110 is configured to determine location information of a wireless receiving end. The identification module 120 is configured to identify a location relationship between the wireless receiving end and a target. The control module 130 is configured to control the wireless transmitting end to suspend energy transmission or to adjust a parameter of energy transmission on basis of the location relationship between the target and the wireless receiving end. In embodiments of the disclosure, the identification module is configured to:
  acquire image information of the wireless receiving end and the target;
  determine the location relationship between the wireless receiving end and the target based on an outline of the wireless receiving end and an outline of the target in the image information,
  wherein the location relationship includes whether the target blocks the wireless receiving end.

In an illustrative embodiment, the wireless transmitting end is provided with a positioning sensor. Still referring to FIG. 9, the device in embodiments of the disclosure includes a determination module 110, an identification module 120 and a control module 130. The device in embodiments of the disclosure is configured to implement the method as shown in FIG. 2. Among them, the determination module 110 is configured to:
  determine a distance between the wireless receiving end and the wireless transmitting end based on data collected by the positioning sensor;
  receive a first height, wherein the first height is sent by the wireless receiving end and for characterizing a height of the wireless receiving end relative to a horizontal plane; and
  determine the location information according to the distance and the first height.

In an illustrative embodiment, the location information includes the coordinate of the wireless receiving end in a preset coordinate system. Still referring to FIG. 9, the device in embodiments of the disclosure includes a determination module 110, an identification module 120 and a control module 130. The device in embodiments of the disclosure is configured to implement the method as shown in FIG. 3. Among them, the determination module 110 is further configured to:
  determine a second height of the wireless transmitting end according to data collected by a height sensor, wherein the height sensor is disposed at the wireless transmitting end and for characterizing a height of the wireless transmitting end relative to the horizontal plane;
  determine a height difference between the wireless transmitting end and the wireless receiving end according to the first height and the second height; and
  determine the coordinate of the wireless receiving end in the preset coordinate system according to the distance and the height difference, wherein:
  an origin of the preset coordinate system is the wireless transmitting end, an XY plane of the preset coordinate system is parallel to the horizontal plane, and a Z axis of the preset coordinate system is perpendicular to the horizontal plane.

In an illustrative embodiment, still referring to FIG. 9, the device in embodiments of the disclosure includes a determination module 110, an identification module 120 and a control module 130. The device in embodiments of the disclosure is configured to implement the method as shown in FIG. 4. Among them, the control module 130 is configured to:
  control the wireless transmitting end to increase the parameter of the energy transmission in response to the target not blocking the wireless receiving end, or
  control the wireless transmitting end to suspend the energy transmission or control a direction of the energy transmission in response to the target blocking the wireless receiving end.

Figure 5:
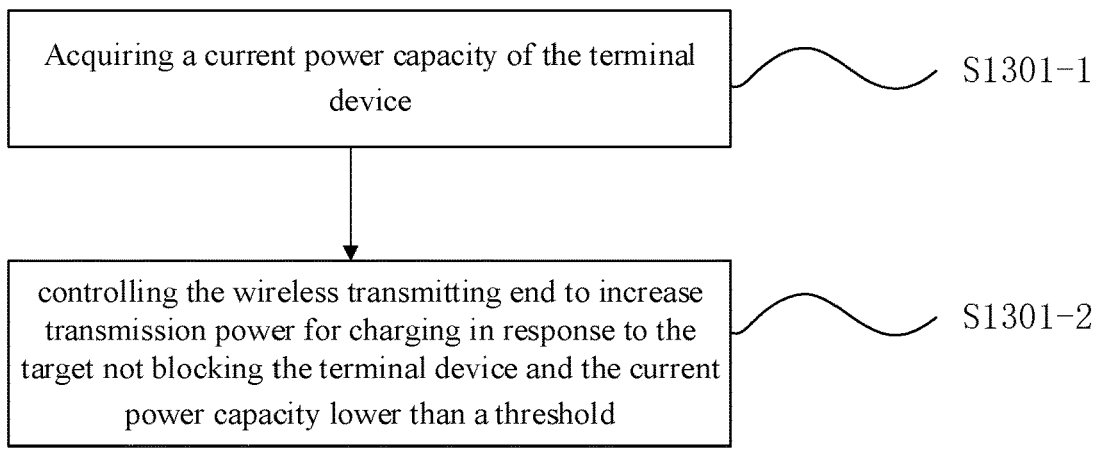
FIG. 5 is a flow chart showing a method according to an embodiment.

The device in embodiments of the disclosure is further configured to implement the method as shown in FIG. 5. Among them, the control module 130 is further configured to:
  acquire a current power capacity of the wireless receiving end, and
  control the wireless transmitting end to increase transmission power for charging in response to the target not blocking the wireless receiving end and the current power capacity lower than a threshold.

In an illustrative embodiment, the wireless transmitting end includes a first antenna assembly. Still referring to FIG. 9, the device in embodiments of the disclosure includes a determination module 110, an identification module 120 and a control module 130.

The device in embodiments of the disclosure is configured to implement the method as shown in FIG. 6. Among them, the control module 130 is further configured to:
  determine a reference path for the energy transmission according to the location information, wherein the reference path directs to the wireless receiving end and avoids the target; and
  adjust a carrier phase of at least one antenna in the first antenna assembly to control a beam direction radiated by the first antenna assembly to be consistent with the reference path.

The device in embodiments of the disclosure is further configured to implement the method as shown in FIG. 7. Among them, the control module 130 is further configured to:
  determine a reflective substrate qualified based on the location information;

receive attitude data from the wireless receiving end, wherein the attitude data is sent by the wireless receiving end;

determine the reference path according to a location of the reflective substrate and the attitude data, wherein:

the reference path includes a first part transmitted from the wireless transmitting end to the reflective substrate, and a second part reflected from the reflective substrate to the wireless receiving end.

In embodiments of the disclosure, the control module is further configured to:

determine a location of a receiving point in the wireless receiving end according to the attitude data;

determine an emission angle of the first part according to the location of the reflective substrate; and determine the reference path by setting the wireless transmitting end as a start point, the reflective substrate as a reflection point and the location of the receiving point as an end point.

In embodiments of the disclosure, an electronic device is provided. The electronic device includes: a processor and a memory for storing instructions executable by the processor. The processor determines location information of a wireless receiving end; identifies a location relationship between the wireless receiving end and a target; and controls the wireless transmitting end to suspend energy transmission or to adjust a parameter of energy transmission on basis of the location relationship between the target and the wireless receiving end.

In embodiments of the disclosure, the wireless transmitting end is provided with a positioning sensor. The processor determines a distance between the wireless receiving end and the wireless transmitting end based on data collected by the positioning sensor; receives a first height, wherein the first height is sent by the wireless receiving end and for characterizing a height of the wireless receiving end relative to a horizontal plane; and determines the location information according to the distance and the first height.

In embodiments of the disclosure, the location information includes a coordinate of the wireless receiving end in a preset coordinate system. The processor determines a second height of the wireless transmitting end according to data collected by a height sensor, wherein the height sensor is disposed at the wireless transmitting end and for characterizing a height of the wireless transmitting end relative to a horizontal plane; determine a height difference between the wireless transmitting end and the wireless receiving end according to the first height and the second height; and determines the coordinate of the wireless receiving end in the preset coordinate system according to the distance and the height difference. An origin of the preset coordinate system is the wireless transmitting end, an XY plane of the preset coordinate system is parallel to the horizontal plane, and a Z axis of the preset coordinate system is perpendicular to the horizontal plane.

In embodiments of the disclosure, the processor acquires image information of the wireless receiving end and the target; and determines the location relationship between the wireless receiving end and the target based on an outline of the wireless receiving end and an outline of the target in the image information. The location relationship includes whether the target blocks the wireless receiving end.

In embodiments of the disclosure, the processor controls the wireless transmitting end to increase the parameter of the energy transmission in response to the target not blocking the wireless receiving end, or controls the wireless transmitting end to suspend the energy transmission or control a direction of the energy transmission in response to the target blocking the wireless receiving end.

In embodiments of the disclosure, the processor acquires a current power capacity of the wireless receiving end, and controls the wireless transmitting end to increase transmission power for charging in response to the target not blocking the wireless receiving end and the current power capacity lower than a threshold.

In embodiments of the disclosure, the wireless transmitting end includes a first antenna assembly. The processor determines a reference path for the energy transmission according to the location information, wherein the reference path directs to the wireless receiving end and avoids the target; and adjusts a carrier phase of at least one antenna in the first antenna assembly to control a beam direction radiated by the first antenna assembly to be consistent with the reference path.

In embodiments of the disclosure, the processor determines a reflective substrate qualified based on the location information; receives attitude data from the wireless receiving end, wherein the attitude data is sent by the wireless receiving end; and determines the reference path according to a location of the reflective substrate and the attitude data. The reference path includes a first part transmitted from the wireless transmitting end to the reflective substrate, and a second part reflected from the reflective substrate to the wireless receiving end.

In embodiments of the disclosure, the processor determines a location of a receiving point in the wireless receiving end according to the attitude data; determines an emission angle of the first part according to the location of the reflective substrate; and determines the reference path by setting the wireless transmitting end as a start point, the reflective substrate as a reflection point and the location of the receiving point as an end point.

Figure 10:
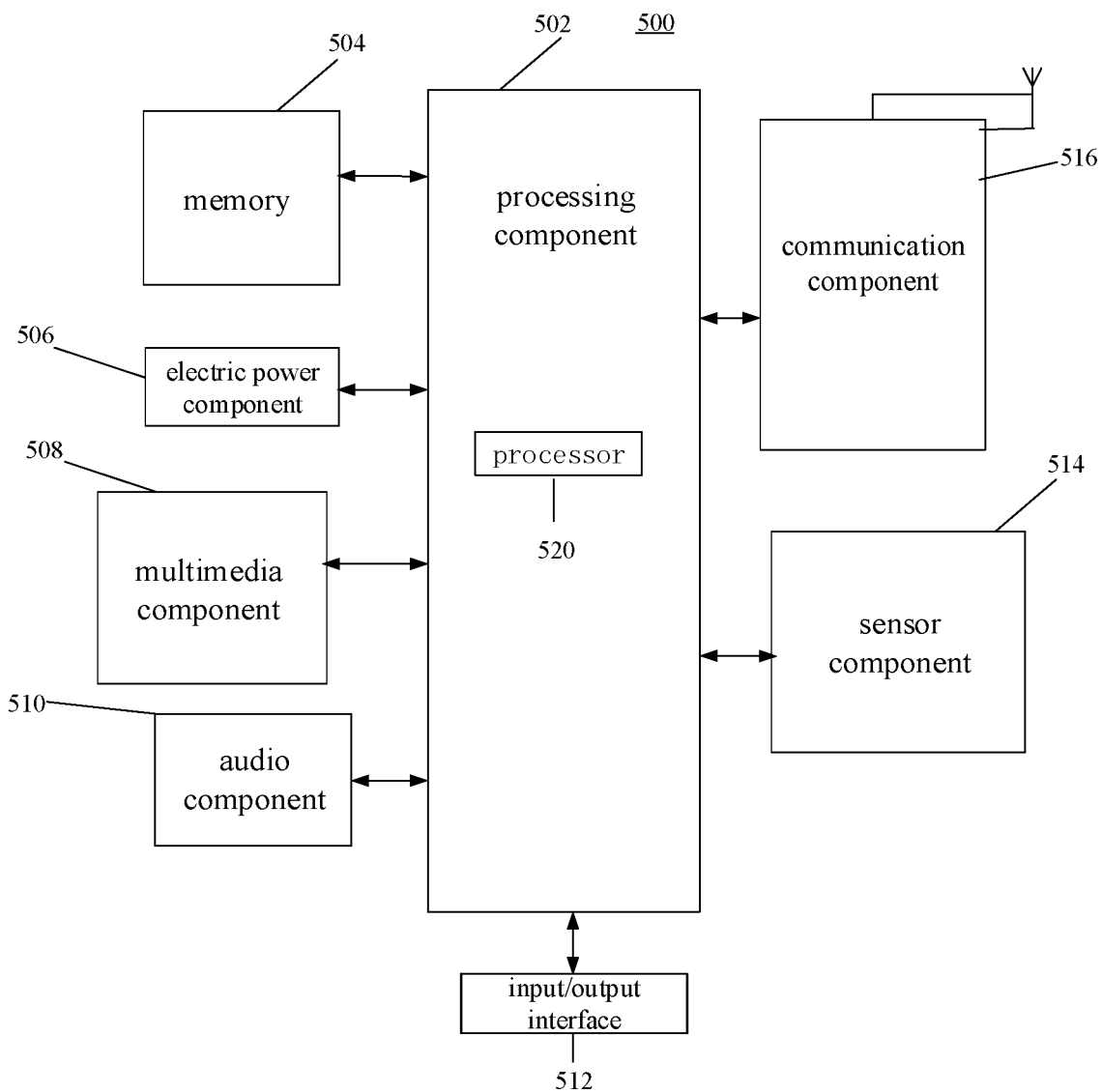
FIG. 10 is a block diagram showing an electronic device according to an embodiment.

FIG. 10 is a block diagram of an electronic device mentioned above. The present disclosure further provides an electronic device. For example, the device 500 may be a mobile phone, a computer, a digital broadcasting terminal, a messaging device, a game console, a tablet device, a medical device, a fitness device, a personal digital assistant and the like.

The device 500 may include one or more of the following components: a processing component 502, a memory 504, an electric power component 506, a multimedia component 508, an audio component 510, an input/output (I/O) interface 512, a sensor component 514, and a communication component 516.

The processing component 502 generally controls the overall operations of the device 500, such as operations associated with display, telephone calls, data communication, camera operation and recording operation. The processing component 502 may include one or more processors 520 to execute instructions to complete all or part of the steps of the foregoing method. In addition, the processing component 502 may include one or more modules to facilitate the interaction between the processing component 502 and other components. For example, the processing component 502 may include a multimedia module to facilitate the interaction between the multimedia component 508 and the processing component 502.

The memory 504 is configured to store various types of data to support operations in the device 500. Examples of these data include instructions for any application or method operating on the device 500, contact data, phone book data, messages, pictures, videos, or the like. The memory 504 can be implemented by any type of volatile or non-volatile storage device or their combination, such as static random access memory (SRAM), electrically erasable programmable read-only memory (EEPROM), erasable and programmable read-only memory (EPROM), programmable read-only memory (PROM), read-only memory (ROM), magnetic memory, flash memory, magnetic disk or optical disk.

The electric power component 506 provides electric power to various components of the device 500. The electric power component 506 may include a power management system, one or more power supplies, and other components associated with generating, managing and distributing power for the device 500.

The multimedia component 508 includes a screen that provides an output interface between the device 500 and the user. In some embodiments, the screen may include a liquid crystal display (LCD) and a touch panel (TP). In the case that the screen includes a touch panel, the screen may be implemented as a touch screen to receive input signals from the user. The touch panel includes one or more touch sensors to sense touch, sliding and gestures on the touch panel. The touch sensor can not only sense the boundary of the touch or slide action, but also detect the duration time and pressure related to the touch or slide operation. In some embodiments, the multimedia component 508 includes one or both of a front camera and a rear camera. When the device 500 is in an operation mode, such as a shooting mode or a video mode, one or both of the front camera and the rear camera can receive external multimedia data. Each of the front camera and the rear camera can be a fixed optical lens system or has focal length and optical zoom capabilities.

The audio component 510 is configured to output and/or input audio signals. For example, the audio component 510 includes a microphone (MIC). When the device 500 is in an operation mode, such as a call mode, a recording mode and a voice recognition mode, the microphone is configured to receive external audio signals. The audio signals received may be further stored in the memory 504 or transmitted via the communication component 516. In some embodiments, the audio component 510 further includes a speaker for outputting audio signals.

The I/O interface 512 provides an interface between the processing component 502 and a peripheral interface module. The peripheral interface module as mentioned above may be a keyboard, a click wheel, a button or the like. These buttons may include but are not limited to a home button, a volume button, a start button and a lock button.

The sensor component 514 includes one or more sensors for providing the device 500 with various aspects of status assessment. For example, the sensor component 514 can detect the on/off status of the device 500 and the relative positioning of components, such as the display and keypad of the device 500. The sensor component 514 can also detect the location change of the device 500 or a component of the device 500, the presence or absence of contact with the device 500, the orientation or acceleration/deceleration of the device 500, and the temperature change of the device 500. The sensor component 514 may include a proximity sensor which is configured to detect the presence of nearby objects when there is no physical contact. The sensor component 514 may also include a light sensor, such as a CMOS or CCD image sensor, for use in imaging applications. In some embodiments, the sensor component 514 may also include an acceleration sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as WiFi, 2G, 3G, or a combination thereof. In an illustrative embodiment, the communication component 516 receives a broadcast signal or broadcast related information from an external broadcast management system via a broadcast channel. In an illustrative embodiment, the communication component 516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an illustrative embodiment, the device 500 may be implemented by one or more application specific integrated circuits (ASIC), digital signal processors (DSP), digital signal processing devices (DSPD), programmable logic devices (PLD), field programmable gate array (FPGA), controller, microcontroller, microprocessor or other electronic components to execute the methods as mentioned above.

Another illustrative embodiment of the present disclosure provides a non-transitory computer-readable storage medium, such as a memory 504 storing instructions. The instructions may be executed by the processor 520 of the device 500 to complete the foregoing method. For example, the computer-readable storage medium may be ROM, random access memory (RAM), CD-ROM, magnetic tape, floppy disk, optical data storage device or the like. When the instructions in the storage medium are executed by the processor of the electronic device, the electronic device is enabled to execute the foregoing method.

Those skilled in the art will easily think of other embodiments of the present disclosure after considering the specification and practicing the present disclosure. This application is intended to cover any variations, uses, or adaptive changes of the present disclosure. These variations, uses, or adaptive changes follow the general principles of the present disclosure and include common knowledge or conventional technical means in the technical field not disclosed in the present disclosure. The description and the embodiments are to be regarded as illustrative, and the true scope and spirit of the present disclosure are pointed out by the claims.

It should be understood that the present disclosure is not limited to the precise structure that has been described above and shown in the drawings, and various modifications and changes can be made without departing from its scope. The scope of the present disclosure is only limited by the claims.

What is claimed is:

1. A method for controlling wireless charging, executed by a wireless transmitting end, the method comprising:
   determining location information of a wireless receiving end;
   identifying a location relationship between the wireless receiving end and a target; and
   controlling the wireless transmitting end to suspend energy transmission or to adjust a parameter of energy transmission on basis of the location relationship between the target and the wireless receiving end;
   wherein the wireless transmitting end is provided with a positioning sensor, and
      determining location information of a wireless receiving end comprises:
         determining a distance between the wireless receiving end and the wireless transmitting end based on data collected by the positioning sensor;

receiving a first height, wherein the first height is sent by the wireless receiving end and for characterizing a height of the wireless receiving end relative to a horizontal plane; and determining the location information according to the distance and the first height;

wherein the location information comprises a coordinate of the wireless receiving end in a preset coordinate system; and determining the location information according to the distance and the first height comprises:

determining a second height of the wireless transmitting end according to data collected by a height sensor, wherein the height sensor is disposed at the wireless transmitting end and for characterizing a height of the wireless transmitting end relative to the horizontal plane;

determining a height difference between the wireless transmitting end and the wireless receiving end according to the first height and the second height; and determining the coordinate of the wireless receiving end in the preset coordinate system according to the distance and the height difference;

wherein an origin of the preset coordinate system is the wireless transmitting end, an XY plane of the preset coordinate system is parallel to the horizontal plane, and a Z axis of the preset coordinate system is perpendicular to the horizontal plane.

2. The method for controlling wireless charging according to claim 1, wherein identifying a location relationship between the wireless receiving end and a target comprises:

acquiring image information of the wireless receiving end and the target; and determining the location relationship between the wireless receiving end and the target based on an outline of the wireless receiving end and an outline of the target in the image information, wherein the location relationship comprises whether the target blocks the wireless receiving end.

3. The method for controlling wireless charging according to claim 2, wherein controlling the wireless transmitting end to suspend energy transmission or to adjust a parameter of energy transmission on basis of the location relationship between the target and the wireless receiving end comprises:

controlling the wireless transmitting end to increase the parameter of the energy transmission in response to the target not blocking the wireless receiving end, or controlling the wireless transmitting end to suspend the energy transmission or controlling a direction of the energy transmission in response to the target blocking the wireless receiving end.

4. The method for controlling wireless charging according to claim 3, wherein controlling the wireless transmitting end to increase the parameter of the energy transmission in response to the target not blocking the wireless receiving end comprises:

acquiring a current power capacity of the wireless receiving end, and controlling the wireless transmitting end to increase transmission power for charging in response to the target not blocking the wireless receiving end and the current power capacity lower than a threshold.

5. The method for controlling wireless charging according to claim 3, wherein the wireless transmitting end comprises a first antenna assembly, and controlling a direction of the energy transmission comprises:

determining a reference path for the energy transmission according to the location information, wherein the reference path directs to the wireless receiving end and avoids the target; and adjusting a carrier phase of at least one antenna in the first antenna assembly, to control a beam direction radiated by the first antenna assembly to be consistent with the reference path.

6. The method for controlling wireless charging according to claim 5, wherein determining a reference path for the energy transmission according to the location information comprises:

determining a reflective substrate qualified based on the location information;

receiving attitude data from the wireless receiving end, wherein the attitude data is sent by the wireless receiving end; and determining the reference path according to a location of the reflective substrate and the attitude data, wherein the reference path comprises a first part transmitted from the wireless transmitting end to the reflective substrate, and a second part reflected from the reflective substrate to the wireless receiving end.

7. The method for controlling wireless charging according to claim 6, wherein determining the reference path according to a location of the reflective substrate and the attitude data comprises:

determining a location of a receiving point in the wireless receiving end according to the attitude data;

determining an emission angle of the first part according to the location of the reflective substrate; and determining the reference path by setting the wireless transmitting end as a start point, the reflective substrate as a reflection point and the location of the receiving point as an end point.

8. An electronic device, comprising:

a processor, and a memory for storing instructions executable by the processor;

wherein the processor determines location information of a wireless receiving end;

identifies a location relationship between the wireless receiving end and a target; and controls the wireless transmitting end to suspend energy transmission or to adjust a parameter of energy transmission on basis of the location relationship between the target and the wireless receiving end;

wherein the wireless transmitting end is provided with a positioning sensor, and the processor is further configured to:

determine a distance between the wireless receiving end and the wireless transmitting end based on data collected by the positioning sensor;

receive a first height, wherein the first height is sent by the wireless receiving end and for characterizing a height of the wireless receiving end relative to a horizontal plane; and determine the location information according to the distance and the first height;

wherein the location information comprises a coordinate of the wireless receiving end in a preset coordinate system; and the processor is further configured to:
determine the location information according to the distance and the first height comprises:
determine a second height of the wireless transmitting end according to data collected by a height sensor, wherein the height sensor is disposed at the wireless transmitting end and for characterizing a height of the wireless transmitting end relative to the horizontal plane;
determine a height difference between the wireless transmitting end and the wireless receiving end according to the first height and the second height; and
determine the coordinate of the wireless receiving end in the preset coordinate system according to the distance and the height difference;
wherein an origin of the preset coordinate system is the wireless transmitting end, an XY plane of the preset coordinate system is parallel to the horizontal plane, and a Z axis of the preset coordinate system is perpendicular to the horizontal plane.

9. The electronic device according to claim 8, wherein the processor acquires image information of the wireless receiving end and the target; and
determines the location relationship between the wireless receiving end and the target based on an outline of the wireless receiving end and an outline of the target in the image information,
wherein the location relationship includes whether the target blocks the wireless receiving end.

10. The electronic device according to claim 9, wherein the processor
controls the wireless transmitting end to increase the parameter of the energy transmission in response to the target not blocking the wireless receiving end, or
controls the wireless transmitting end to suspend the energy transmission or control a direction of the energy transmission in response to the target blocking the wireless receiving end.

11. The electronic device according to claim 10, wherein the processor acquires a current power capacity of the wireless receiving end, and controls the wireless transmitting end to increase transmission power for charging in response to the target not blocking the wireless receiving end and the current power capacity lower than a threshold.

12. The electronic device according to claim 10, wherein the wireless transmitting end comprises a first antenna assembly,
the processor determines a reference path for the energy transmission according to the location information, wherein the reference path directs to the wireless receiving end and avoids the target; and adjusts a carrier phase of at least one antenna in the first antenna assembly to control a beam direction radiated by the first antenna assembly to be consistent with the reference path.

13. The electronic device according to claim 12, wherein the processor
determines a reflective substrate qualified based on the location information;
receives attitude data from the wireless receiving end, wherein the attitude data is sent by the wireless receiving end;
determines the reference path according to a location of the reflective substrate and the attitude data,
wherein the reference path includes a first part transmitted from the wireless transmitting end to the reflective substrate, and a second part reflected from the reflective substrate to the wireless receiving end.

14. The electronic device according to claim 13, wherein the processor
determines a location of a receiving point in the wireless receiving end according to the attitude data;
determines an emission angle of the first part according to the location of the reflective substrate; and
determines the reference path by setting the wireless transmitting end as a start point, the reflective substrate as a reflection point and the location of the receiving point as an end point.

15. A non-transitory computer-readable storage medium having stored therein instructions that, when executed by a processor of an electronic device, causes the electronic device to perform a method for controlling wireless charging, the method comprising:
determining location information of a wireless receiving end;
identifying a location relationship between the wireless receiving end and a target; and
controlling the wireless transmitting end to suspend energy transmission or to adjust a parameter of energy transmission on basis of the location relationship between the target and the wireless receiving end;
wherein the wireless transmitting end is provided with a positioning sensor, and
determining location information of a wireless receiving end comprises:
determining a distance between the wireless receiving end and the wireless transmitting end based on data collected by the positioning sensor;
receiving a first height, wherein the first height is sent by the wireless receiving end and for characterizing a height of the wireless receiving end relative to a horizontal plane; and
determining the location information according to the distance and the first height;
wherein the location information comprises a coordinate of the wireless receiving end in a preset coordinate system; and
determining the location information according to the distance and the first height comprises:
determining a second height of the wireless transmitting end according to data collected by a height sensor, wherein the height sensor is disposed at the wireless transmitting end and for characterizing a height of the wireless transmitting end relative to the horizontal plane;
determining a height difference between the wireless transmitting end and the wireless receiving end according to the first height and the second height; and
determining the coordinate of the wireless receiving end in the preset coordinate system according to the distance and the height difference;
wherein an origin of the preset coordinate system is the wireless transmitting end, an XY plane of the preset coordinate system is parallel to the horizontal plane, and a Z axis of the preset coordinate system is perpendicular to the horizontal plane.

* * * * *